United States Patent Office 3,496,235
Patented Feb. 17, 1970

3,496,235
DISECONDARY BIPHOSPHINE DISULFIDES AND
THE PREPARATION THEREOF
Ludwig Maier, Zurich, Switzerland, assignor to Monsanto
Company, St. Louis, Mo., a corporation of Delaware
No Drawing. Filed Nov. 20, 1967, Ser. No. 684,535
Claims priority, application Switzerland, Dec. 7, 1966,
17,939/66
Int. Cl. C07f 9/50, 9/46; A01n 9/36
U.S. Cl. 260—606.5          8 Claims

ABSTRACT OF THE DISCLOSURE

Disecondary biphosphine disulfides of the formula $$H(R)\underset{\underset{S}{\|}}{P}-\underset{\underset{S}{\|}}{P}(R)H$$

and a process for making by the following reaction:

$$R'_2N(R)P-P(R)NR'_2 + 4H_2S \longrightarrow$$
$$H(R)\underset{\underset{S}{\|}}{P}-\underset{\underset{S}{\|}}{P}(R)H + 2R'NH\cdot H_2S$$

The disecondary biphosphine disulfides are biologically active compounds, e.g., insecticide, and are also useful as intermediates for making biphosphines by desulfurization.

---

This invention relates to novel disecondary biphosphine disulfides of the general formula $$\underset{H}{\overset{R}{\diagdown}}\underset{\underset{S}{\|}}{P}-\underset{\underset{S}{\|}}{P}\underset{H}{\overset{R}{\diagup}}$$

in which R signifies a possibly substituted hydrocarbon group or heterocyclic group, which can be ethylenically or acetylenically unsaturated, and to a process for preparing these compounds.

There has been no success up to now in the preparation of biphosphines having reactive groups, since the P—P linkage has been split off in all investigated reactions. While the action of, e.g., bromine on the simple aminophosphine may lead to stable adducts, the corresponding diamino-biphosphines are always cleaved. The diamino-biphosphines are also cleaved by, e.g., ethyl iodide and hydrochloric acid even at room temperature (W. Seidel, Ztschr. anorg. allgem. Chem. 330, 141 (1964)).

It has now been found that disecondary biphosphine disulfides are obtained, when a diamino-biphosphine of the general formula $$R'_2N(R)P—P(R)NR'_2$$

in which R is defined as above and $NR'_2$ represents a tertiary amino group, is heated with at least a fourfold molar amount of hydrogen sulfide, whereby the amino groups are replaced by hydrogen sulfide in surprising manner without cleavage of the P—P bond.

The diamino-biphosphine can be prepared from amino-organo-halophosphines by treating with a sodium-potassium alloy in ether at −10 to −20° C. (W. Seidel and K. Issleib, Z. anorg. allgem. Chem. 325, 113 (1963)). The amino-organo-halophosphine can be obtained generally by reatcion of organodihalophosphines with secondary amines. Numerous organodihalophosphines are well-known, which are suitable for preparing the starting compounds. Well-known examples of the group R are: ethyl, methyl, propyl, iso-propyl, butyl, iso-butyl, iso-amyl, phenyl, benzyl, 2-, 3- and 4-tolyl, 2,4- and 2,5-xylyl, 4-ethylphenyl, 2,4,5- and 2,4,6-trimethylphenyl, 4-iso-propylphenyl, biphenylyl, triphenylmethyl, 1- and 2-naphthyl, 3-dibenzofuranyl and 2-thienyl. Normally, the R groups will have not more than 24 carbon atoms and for some uses not more than 8 carbon atoms.

The group R can also show substituents. Well-known examples are chloromethyl, trifluoromethyl, 2-chlorooctyl, 4-bromophenyl, pentafluorophenyl, 4-dimethylaminophenyl, 4-diethylaminophenyl, 4-benzyl-ethylaminophenyl, 4-methyl-phenylaminophenyl, 4-methoxyphenyl, 4-phenoxyphenyl and 2-chloro-4-methylphenyl.

Moreover, the group R can show ethylenic or acetylenic unsaturation. Well-known examples are vinyl, allyl, styryl and phenylethynyl.

The group R consequently will depend on the available organodihalophosphines. Any existing organodihalophosphine via the corresponding amino-organo-halophosphine can be converted to the corresponding disecondary biphosphine disulfide according to the process of invention. In existing substituted organodihalophosphines there is no imaginable substituent which would hinder the reaction of invention.

The amino group has an auxiliary function only, because it is split off in the reaction. The group of easily volatile amines, especially the dimethylamino group and diethylamino group therefore, will be preferred.

There have been described in the literature, for example, bis - (diethylamino-ethylphosphine), bis - (diethylamino-cyclohexylphosphine), bis - (diethylamino-phenylphosphine) and bis - (dimethylaminophenylphosphine), which are suitable starting compounds. Other starting compounds can be prepared in similar manner.

The reaction of invention proceeds according to the equation $$R'_2N(R)P—P(R)NR'_2 + 4H_2S \longrightarrow$$
$$H(R)\underset{\underset{S}{\|}}{P}-\underset{\underset{S}{\|}}{P}(R)H + 2R'NH\cdot H_2S$$

On practicing the reaction, hydrogen sulfide is expediently conducted into a heated solution of the diaminobiphosphine. If the cleaved amine is easily volatile, it evolves from the reaction mixture in the form of amine hydrosulfide and the separation can be observed on the colder parts of the apparatus employed. The separation of the amine hydrosulfide, however, can also be achieved by washing the reaction solution with water.

Suitable inert solvents are, for example, hydrocarbons such as benzene, toluene, xylene, Decalin and methylnaphthalene. The reaction can be carried out at the boiling point of the employed solvents or at lower temperatures.

EXAMPLE 1

Hydrogen sulfide is led into a refluxing solution of 19 g. of $(C_6H_5)(C_2H_5)_2NP—PN(C_2H_5)_2(C_6H_5)$ in 100 ml. of benzene until no more $(C_2H_5)_2NH\cdot H_2S$ deposits in the condenser, which occurs after about 3 hours. The compound $$H(C_6H_5)\underset{\underset{S}{\|}}{P}-\underset{\underset{S}{\|}}{P}(-C_6H_5)H$$

crystallizes on evaporating the benzene. Yield 12.6 g. (85.2%), M.P. 128–132° C.

Analsis.—$C_{12}H_{12}P_2S_2$ (282.3). Calc'd: S, 22.71%. Found: S, 22.53.

In similar manner, there are obtained from bis-(diethylamino-ethylphosphine) and from bis-(diethylamino-cyclohexylphosphine) the corresponding disecondary bisphosphine disulfides as oily liquid, or crystalline solid, respectively.

The disecondary biphosphine disulfides are biologically active compounds, e.g. insecticides. Moreover, they are valuable intermediates, e.g. for making biphosphines by desulfurization by processes well known in the art for desulfurizing other pentavalent phosphorus sulfur compounds.

The embodiments of the invention in which an exclusive property or privilege is claimed are defined as follows:

1. A process for preparing disecondary biphosphine disulfides of the formula

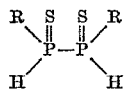

in which R signifies a alkyl, cycloalkyl, aralkyl, alkaryl or aryl hydrocarbon group having not more than 24 carbon atoms and wherein the aryl groups are either monocyclic or bicyclic, comprising reacting a diamino-biphosphine of the general formula

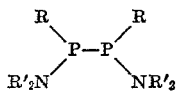

in which R is defined as above and $NR'_2$ represents a tertiar amino group, with at least a fourfold molar amount of hydrogen sulfide at a temperature sufficient to split off amino groups.

2. A process of claim 1, wherein the reaction is carried out in an inert solvent.

3. A process of claim 1, wherein R' is an alkyl group having 1 to 3 carbon atoms.

4. A process of claim 1, wherein hydrogen sulfide is led into a solution which is heated at least to 80° C.

5. A process of claim 1, wherein R is an aromatic hydrocarbon group.

6. A compound of the formula

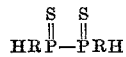

wherein R signifies an alkyl, cycloalkyl, aralkyl, alkaryl or aryl hydrocarbon group having not more than 24 carbon atoms and wherein the aryl groups are either monocyclic or bicyclic.

7. A compound of claim 6 wherein R is a monocyclic or bicyclic aromatic hydrocarbon group.

8. A compound of claim 6 wherein R is a phenyl group.

References Cited

UNITED STATES PATENTS

| | | | |
|---|---|---|---|
| 3,053,900 | 9/1962 | Harwood et al. | 260—606.5 |
| 3,086,053 | 4/1963 | Wagner | 260—606.5 |
| 3,253,033 | 5/1966 | Maier | 260—606.5 X |

TOBIAS E. LEVOW, Primary Examiner

W. F. W. BELLAMY, Assistant Examiner

U.S. Cl. X.R.

424—204

UNITED STATES PATENT OFFICE
CERTIFICATE OF CORRECTION

Patent No. 3,496,235    Dated February 17, 1970

Inventor(s)  Ludwig Maier

It is certified that error appears in the above-identified patent and that said Letters Patent are hereby corrected as shown below:

Column 1, line 64, the word "reatcion" should read -- reaction --.

Column 2, line 53, the portion of the sentence reading "$PN(C_2H)_2$" should read -- $PN(C_2H_5)_2$ --.

Column 2, line 57, that portion of the formula reading $$\underset{S}{\overset{\|}{P}}(-C_6 \quad \text{should read} \quad \underset{S}{\overset{\|}{P}}(C_6$$

Column 2, line 63, the figure "22.53" should read -- 22.53% --.

Signed and sealed this 15th day of February 1972.

(SEAL)
Attest:

EDWARD M. FLETCHER, JR.
Attesting Officer

ROBERT GOTTSCHALK
Commissioner of Patents